No. 635,889. Patented Oct. 31, 1899.
F. HEINZ.
LAWN MOWER.
(Application filed Dec. 21, 1897.)
(No Model.) 2 Sheets—Sheet 1.

Witnesses.
C. M. Knapp
Mabelle W. Jones.

Inventor.
Frank Heinz
By Cilley & Allgin
Attorneys

No. 635,889. Patented Oct. 31, 1899.
F. HEINZ.
LAWN MOWER.
(Application filed Dec. 21, 1897.)
(No Model.) 2 Sheets—Sheet 2.

Witnesses.
C. M. Knapp
Mabelle W. Jones.

Inventor.
Frank Heinz.
By Cilley & Allgier
Attorneys.

UNITED STATES PATENT OFFICE.

FRANK HEINZ, OF GRAND RAPIDS, MICHIGAN.

LAWN-MOWER.

SPECIFICATION forming part of Letters Patent No. 635,889, dated October 31, 1899.

Application filed December 21, 1897. Serial No. 662,912. (No model.)

*To all whom it may concern:*

Be it known that I, FRANK HEINZ, a citizen of the United States, residing at the city of Grand Rapids, in the county of Kent and State of Michigan, have invented certain new and useful Improvements in Lawn-Mowers, of which the following is a specification.

My invention relates to improvements in rotary lawn-mowers; and its object is to provide a rotary lawn-mower that will cut the grass close to the walls, fences, &c. I attain this object by the mechanism illustrated in the accompanying drawings, in which—

Figure 1:
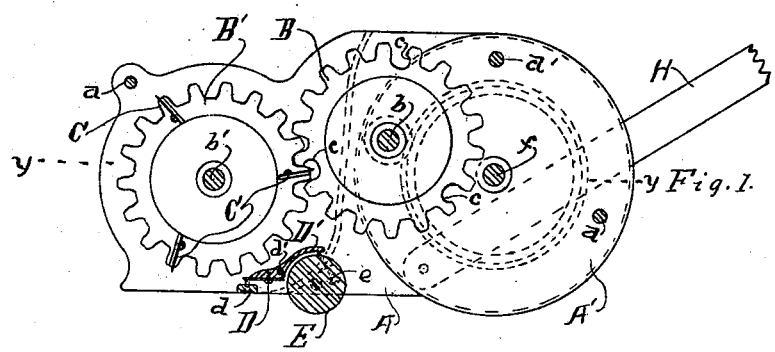
Figure 2:
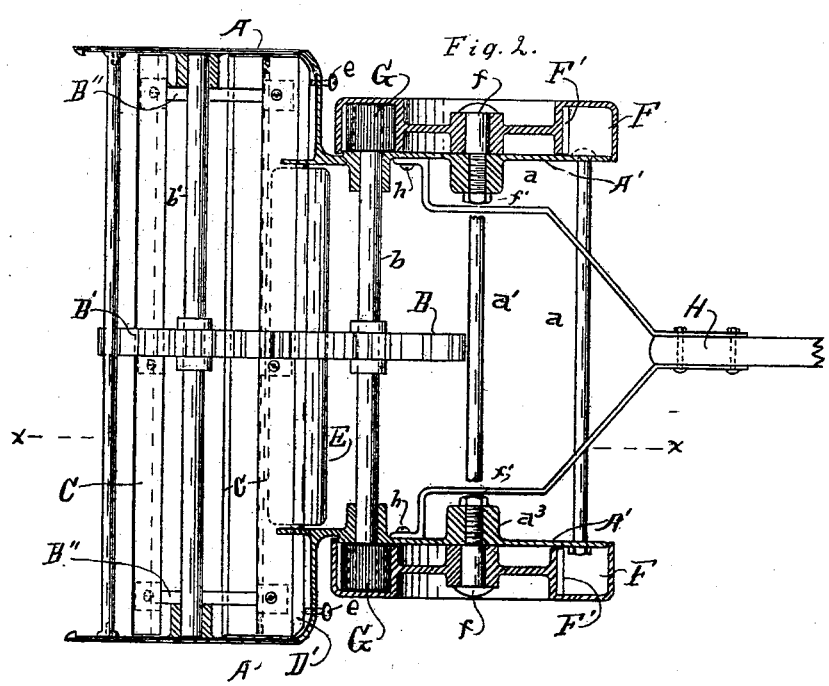
Figure 3:
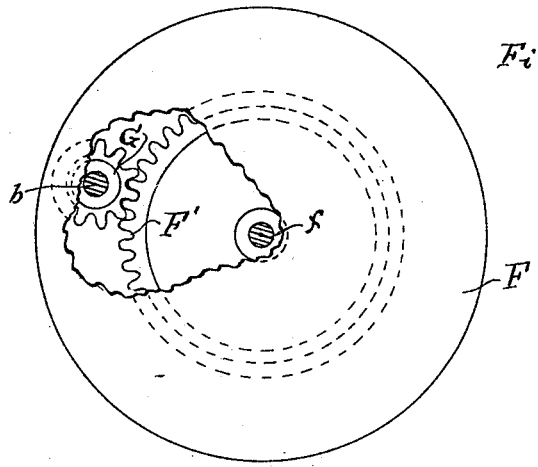
Figure 4:
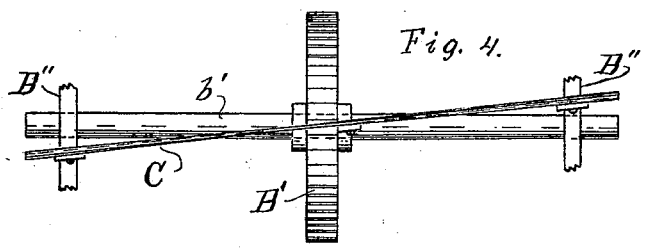
Figure 5:
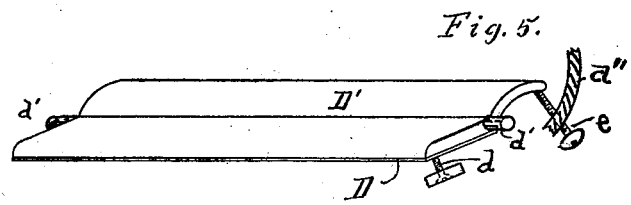

Figure 1 is a sectional elevation of my mower, looking to the right from the line $xx$ of Fig. 2. Fig. 2 is a sectional plan of the same on the line $yy$ of Fig. 1 with the drive-wheels and shafts in place. Fig. 3 is an elevation of one of the traction-wheels with a portion cut away to show the driving-gear in mesh. Fig. 4 is a plan of the knife-shaft, showing the relative position of the knife therewith; and Fig. 5 is a perspective of the lower knife-bar and roller-guard.

Similar letters refer to similar parts throughout the several views.

The frame or case A of my lawn-mower is constructed of substantially the form shown in Figs. 1 and 2, the portion A' being fitted to form a substantially dust-proof joint with the rims of the traction-wheels F, and is supported by the cross-bars $a$ and $a'$, a portion of $a'$ being shown in Fig. 2 to show its relative position with the frame and with the other bars. The outer rims of the traction-wheels form a chamber within which is a second rim F, having gear-teeth cut upon its surface and arranged to mesh with the gear-wheel G, which transmits motion to the shaft $b$, upon which is secured the gear-wheel B, which in turn meshes with the gear-wheel B', in the teeth of which I secure the knives C near this longitudinal center, with the edges of the knives projecting beyond the ends of the teeth, as shown in Fig. 1. The wheels B and B' are of equal size and have an equal number of teeth. The teeth upon the wheel B that mesh with the teeth upon the wheel B' to which the knives are attached are chambered, as at $c$, so that the edges of the knives cannot come in contact with the teeth, and thus I avert the danger of marring or dulling the sharp edges thereof when passing said teeth in their revolution when cutting grass. The wheel B' is mounted upon the shaft $b'$, near each end of which I mount an arm B", designed to support the ends of the knives. The knives are placed diagonal of the shaft $b'$, so that they work upon a perfect shear cut.

The stationary knife D is secured to an adjustable head D', which in turn is pivoted to the frame by the bearings $d'$, so that it may be pivotally adjusted by the use of the screws $e$ and $d$, so that I am enabled to adjust my knives to a nicety. The back portion of the support D' forms a bonnet over the roller E and prevents grass from falling thereon and clogging between the roller and the knife, the roller E being designed to support the front of the mower and hold the knives from the ground.

The traction-wheels F are supported upon stationary bearings $f$, which are secured in the hubs $a^3$ and insured against becoming loosened by the jam-nuts $f'$ or in any other suitable manner.

H is the handle by which the machine is manipulated, which is pivoted to the frame, as at $h$, so that its free end may be adjusted vertically as desired.

Having thus fully described my invention, what I claim as new, and desire to secure by Letters Patent of the United States, is—

In a lawn-mower, a frame, traction-wheels, mounted on said frame, a multiple gear arranged to revolve a driving-shaft rapidly, a driving-gear at the longitudinal center of said shaft, a knife-reel, a driven gear at the longitudinal center of said reel in position to be driven by the aforesaid driving-gear, full-length knives mounted on said knife-reel said knives secured to the reel-gear at an angle to the radii thereof, and having their edges project beyond the ends of the gear-teeth, the said reel-gear being the central support of the knives, the teeth on the driving-gear that mesh with the teeth on the driven gear that support the knives, made concave on one side for the passage of the projecting edges of the knives to prevent them from coming in contact with the metal and dulling them, and an adjustable knife in the frame to act with the rotating knives to cut the grass, substantially as and for the purpose set forth.

Signed at the city of Grand Rapids, Michigan, this 16th day of December, 1897.

FRANK HEINZ.

In presence of—
ITHIEL J. CILLEY,
WALTER L. ALLEN.